United States Patent [19]

Holm et al.

[11] 4,044,227

[45] Aug. 23, 1977

[54] BAR CODE READER

[75] Inventors: James P. Holm, Kalamazoo; Ronald J. Dudley, Portage, both of Mich.

[73] Assignee: The Upjohn Company, Kalamazoo, Mich.

[21] Appl. No.: 602,777

[22] Filed: Aug. 7, 1975

[51] Int. Cl.$^2$ .......................... G06K 7/12; H04N 7/00; G06K 19/06; B07C 5/34

[52] U.S. Cl. ............................ 235/61.7 R; 209/111.5; 250/568; 235/61.11 E; 235/61.12 N; 358/160

[58] Field of Search ............... 235/61.11 G, 61.11 E, 235/61.11 D, 61.7 B, 61.12 R, 61.12 N, 61.7 R; 340/146.3 K; 178/6, 6.8, 7.1, 7.2; 250/566, 568; 209/111.5, 111.8

[56] References Cited

U.S. PATENT DOCUMENTS

| | | | |
|---|---|---|---|
| 3,409,129 | 11/1968 | Sperry | 209/111.8 |
| 3,414,731 | 12/1968 | Sperry | 250/568 |
| 3,519,145 | 7/1970 | MacDonald | 214/11 |
| 3,553,438 | 1/1971 | Blitz | 178/6 |
| 3,562,494 | 2/1971 | Schmidt | 235/61.11 E |
| 3,628,014 | 12/1971 | Grubic | 250/49.5 A |
| 3,663,801 | 5/1972 | Wahli | 235/61.11 E |
| 3,719,777 | 3/1973 | von Reichenbach | 178/6.8 |
| 3,763,351 | 10/1973 | Deerhake | 235/61.11 E |
| 3,777,165 | 12/1973 | Bryant | 235/61.11 E |
| 3,794,812 | 2/1974 | Bryant | 235/61.11 E |
| 3,806,706 | 4/1974 | Hasslinger | 235/61.11 E |
| 3,838,251 | 9/1974 | Herrin | 235/61.11 E |
| 3,854,035 | 12/1974 | Tyler | 235/61.11 E |
| 3,862,400 | 1/1975 | Thompson | 235/61.11 E |
| 3,882,301 | 5/1975 | Nassimbene | 235/61.11 E |
| 3,916,154 | 10/1975 | Hare | 235/61.11 E |

*Primary Examiner*—Robert M. Kilgore

*Attorney, Agent, or Firm*—Blanchard, Flynn, Thiel, Boutell & Tanis

[57] ABSTRACT

A compact, self-clocking bar code has a multi-width acquisition bar and a plurality of contiguous data spaces. Data bars occupy selected data spaces to define a code. The bar code is emplaceable on an article or label for identification or other purposes. Scanning means redundantly line scan across the bars and produce a video signal having an amplitude pattern corresponding to the scanned bar code. A decoder includes window logic confining video processing to a read window in the video field in which the scanned bar code is to appear. The decoder includes a high frequency clock circuit and means initially processing, or "digitizing", the raw video signal. A strobe circuit incorporates a side loading up-down counter which initially counts and stores clock pulses in proportion to the scanned width of the acquisition bar. The counter repetitively counts from the stored count down to zero to provide a series of strobe pulses which are to coincide with scanning beam movement across the centers of the data spaces in the bar code during a given scan line. Detector circuitry compares the video amplitudes coincident with the series of strobe pulses, with a stored reference code, and when same match, provides a "compare" output. Compare pulses for each of a preselected number of successive scan lines across the bar code indicate that the bar code is the proper one. A color CCTV monitor displays in different colors the read window, the scanned bar code, strobe lines marking data space centers, and so forth. Modifications include an increase in characters represented by a bar code without increase in bar code size, and use of low persistence or high persistence monochromatic scanning devices.

24 Claims, 12 Drawing Figures

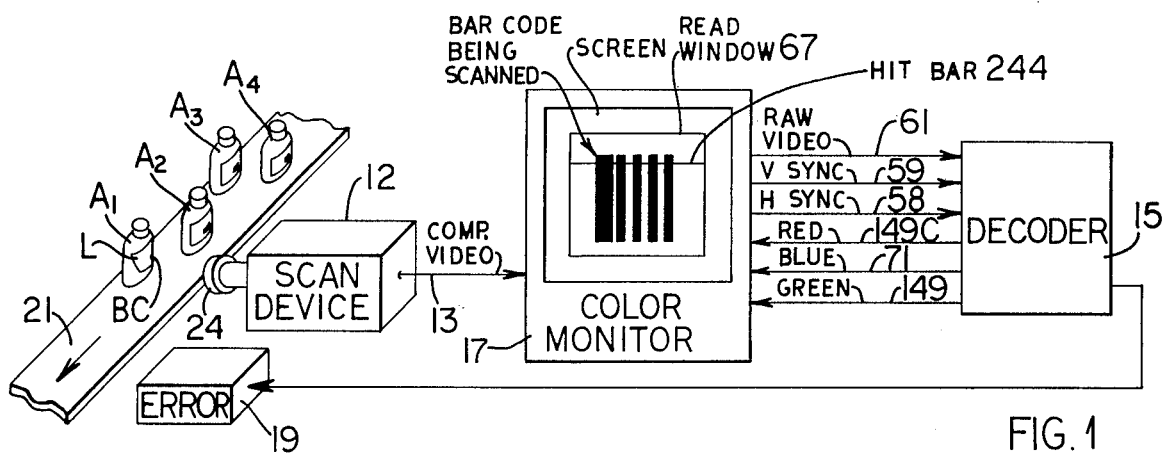
FIG. 1
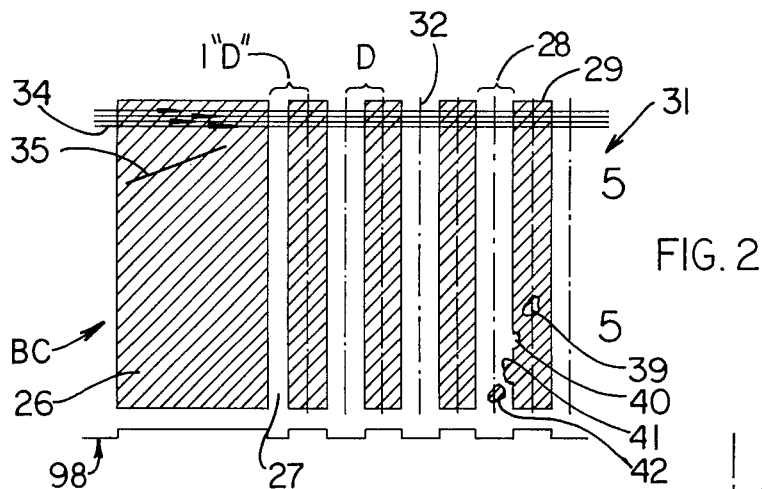
FIG. 2
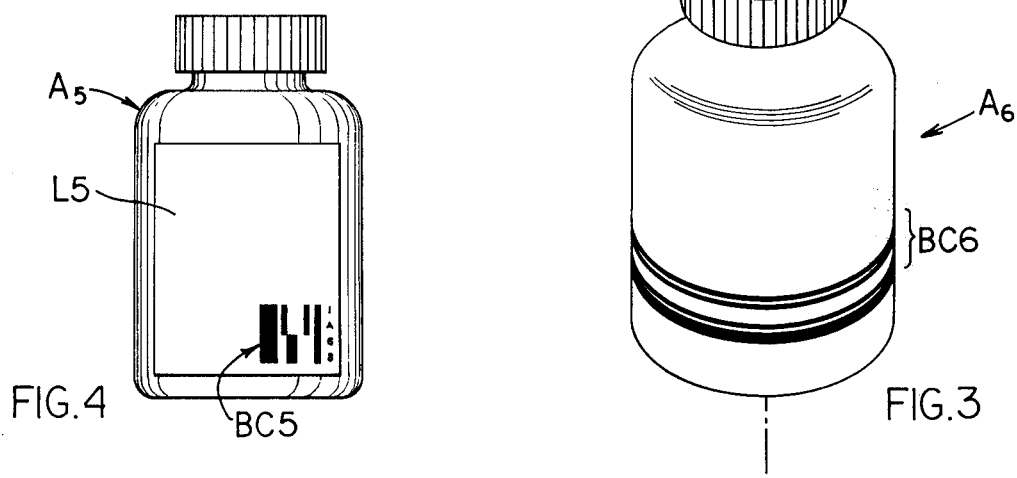
FIG. 4    FIG. 3
FIG. 5A      FIG. 5B

BAR CODE READER

FIELD OF THE INVENTION

This invention relates to mark sensing systems and particularly to a system for reading a bar code and a compact bar code arrangement useable therewith.

BACKGROUND OF THE INVENTION

While mark sensing systems are known for purposes such as identifying, sorting, and obtaining information from articles ranging from checks to railway cars, and some have enjoyed commercial use, difficulties have been encountered in some instances which the present invention seeks to overcome.

The present invention, though useable in a variety of applications, was particularly developed for identification and sorting of articles, such as vials, bottles, cartons, and the like as in pharmaceutical manufacturing environment, particularly to enable automatic separation of mislabeled articles from a rapidly moving article stream under production conditions.

Proposed systems for this purpose have not been fully satisfactory. One approach marked article labels with invisible codes, for example in magnetizable ink on the back of the label. Marks were sensed through the thickness of the label with a magnetic sensor. However, this required very close spacing of the label marking and sensing device, a condition frequently not achievable on practical article conveying lines. Other known approaches printed codes of various configurations on labels or articles and optically read same. Difficulties included the need for unrealistically high accuracy in printing the code on the label or article, precise control of interplacement and orientation of the sensing device and the code marking on the label or article, a large physical code size (particularly difficult with a small article whose label is to include substantial legible printed information, in addition to the bar code, and may have a maximum dimension of only an inch or two), and so forth.

Accordingly, the objects of this invention include provision of:

A bar code and reader system wherein the bar code is compact and self-clocking, has a plurality of contiguous side-by-side data spaces, and permits data bars forming the coded information to lie in either contiguous and noncontiguous relation.

A system, as aforesaid, in which the data area of the bar code is subdividable lengthwise of the data spaces to radically increase the number of codeable character combinations and wherein the bar code need occupy only a relatively small portion of the surface or label on even relatively small containers, such as pharmaceutical containers of various kinds.

A system as aforesaid, which permits reading of the bar code on a label or article despite substantial variations in bar code size, the location and orientation of successively presented code bearing labels or articles, camera to article spacing, the speed of movement of bar coded articles with respect to the scanning device and so forth.

A system, as aforesaid, capable of high speed, high redundancy line scanning of a bar code, wherein a given bar code image may be line scanned a thousand or more times, with successive scan lines displaced along the length of the code bars.

A system, as aforesaid, which provides high reliability code reading despite substantial imperfections in printing of a bar code.

A system, as aforesaid, capable of alternatively employing different scanning devices particularly matched to the manner of presentation of coded articles, wherein slow moving, close spaced articles may be scanned by high speed, low persistence television camera, and wherein rapidly moving, widely spaced articles may be scanned by a high persistence, image storing Vidicon in cooperation with a periodically actuated high speed strobe lamp.

A system, as aforesaid, which includes circuitry responsive to scanning of an acquisition bar in the bar code for establishing the time spacing of a series of strobe pulses in each scan of the code, wherein the time spacing of the strobe pulses corresponds to the expected lateral center of each of the series of data spaces in the code, and wherein the successive data spaces are interrogated for presence or absence of a data bar only at very narrow locations therein determined by such strobe pulses.

A system, as aforesaid, which produces strobe pulses in a series of down counting operations interspersed by a substantially instantaneous parallel count shift from storage to counting means.

Apparatus, as aforesaid, in which a relatively simple "good-bad" criterion indicates whether a scanned bar code is a proper one.

A system, as aforesaid, wherein a color CCTV receiver may be used as a system monitor in cooperation with a black and white scanning device, wherein different colors displayed on the monitor portray the instantaneous status of a corresponding plurality of different system parameters, both for purposes of setting up the system and in ongoing system operation.

A system, as aforesaid, capable of reading bar codes with high reliability and controlling acceptance of properly labeled articles or rejection of improperly labeled articles.

Other objects and purposes of this invention will be apparent to persons acquainted with apparatus of this general type upon reading the following specification and inspecting the accompanying drawings.

BRIEF DESCRIPTION OF THE DRAWINGS

FIG. 1 is a block diagram of a system embodying the invention.

FIG. 2 discloses a preferred bar code configuration.

FIG. 3 is a pictorial view of an article carrying a circumferentially extended bar code according to the present invention.

FIG. 4 is a pictorial view of an article having a label incorporating a bar code according to the present invention.

FIGS. 5A and 5B show a modified bar code format, with two and four character variations.

SUMMARY OF THE INVENTION

Figure 6:
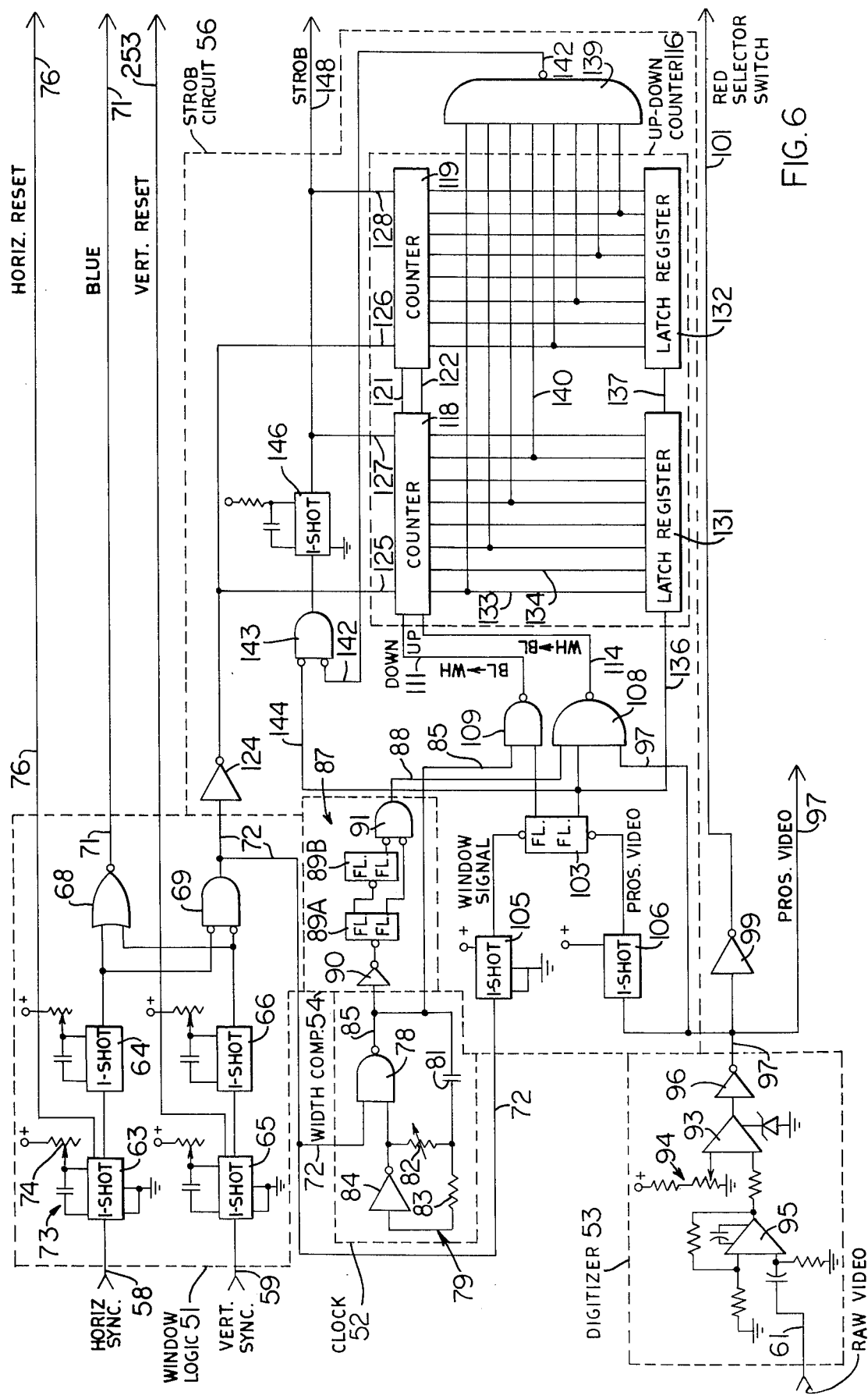
FIG. 6 is a schematic diagram of a first portion of the decoder circuitry of FIG. 1.

The objects and purposes of the invention are met by providing a compact, self-clocking bar code having a multiwidth acquisition bar and a plurality of contiguous data spaces. Data bars occupy selected data spaces to define a code. The bar code is emplaceable on an article or label for identification or other purposes. Scanning means redundantly line scan across the bars and produce a video signal having an amplitude pattern corresponding to the scanned bar code. A decoder includes window logic confining video processing to a read window in the video field in which the scanned bar code is to appear. The decoder includes a high frequency clock circuit and means initially processing, or "digitizing", the raw video signal. A strobe circuit incorporates a side loading up-down counter which initially counts and stores clock pulses in proportion to the scanned width of the acquisition bar. The counter repetitively counts from the stored count down to zero to provide a series of strobe pulses which are to coincide with scanning beam movement across the centers of the data spaces in the bar code and during given scan line. Detector circuitry compares the video amplitudes coincident with the series of strobe pulses, with a stored reference code, and when same match, provides a "compare" output. Compare pulses for each of a preselected number of successive scan lines across the bar code indicate that the bar code is the proper one. A color CCTV monitor displays in different colors the read window, the scanned bar code, strobe lines marking data space centers, and so forth. Modifications include an increase in characters represented by a bar code without increase in bar code size, and use of low persistence or high persistence monochromatic scanning devices.

DETAILED DESCRIPTION

In FIG. 1, a system embodying the invention includes a scanning device 12, a decoder 15, a color CCTV monitor 17 coupled to the scanning device 12 and decoder 15, and an error device 19 driven by the decoder 15.

The scanning device 12 preferably comprises a conventional CCTV black and white camera having a conventional line scanning raster.

Figure 1 also discloses a typical application of the system, particularly for detecting properly labelled articles A1-A4 moved past the scanning device 12 on a conveyor line 21 in the direction of the arrow A. The articles A1-A4 are herein indicated as bottles or vials for pharmaceutical material but may be cartons, containers or articles of any desired type. The articles A1-A4 shown bear labels L on which an identifying bar code BC, in accord with the present invention, is printed. The bar codes BC substantially face the scanning device 12 as the articles move therepast. However, a bar code BC may instead be applied to an article in any convenient way, as by direct application to the article itself or other than printing, so long as "visible" to the scanning device 12. Further, relative motion between the scanning device 12 and articles may be achieved in any convenient manner.

The system shown can reliably read the bar codes BC despite substantial variation in the article to scanning device distance, within the depth of field characteristic of the optical system 24 of a given scanning device 12. Conveniently, the optical system 24 may include a zoom lens to enable ready adjustment of focal length where the scanning device 12 is to be alternatively used on different conveyor lines or at differing distances therefrom, or where a given line may alternatively carry articles having differently sized bar codes on different production runs. On a given run, the articles A1-A4 may be somewhat randomly distributed across the width of the conveyor 21 if the bar code BC is oriented toward the scanning device 12. Moreover, the present system tolerates considerable horizontal and vertical variation in the location of the bar code as long as the latter is within a "window" area (hereafter discussed) of the scanning device field. Also, the present system tolerates substantial variation (up to about + or −45°) in inclination of the bar code, as indicated for example by the tilted label L on article A1.

FIG. 2 shows one preferred bar code format, comprising an elongate acquisition bar 26 paralleled and followed by a relatively narrow acquisition verify space 27 and a plurality of contiguous, elongate data spaces 28. The data spaces are of equal width, i.e. one data interval D wide. Any data space 28 may be occupied by a data bar 29, the pattern of data bars providing a code representative of, for example, hexadecimal characters. The preferred format shown provides eight data spaces, the first four data spaces and the second four data spaces each having a binary distribution of data bars representing a desired hexadecimal character. Thus, two hexadecimal characters can be represented by the format of FIG. 2. The unoccupied data spaces and data bars are here shown in white and black, respectively, and conveniently are so displayed on an article. While any desired coding relation of characters to bars and spaces can be used, in the disclosed embodiment a white data space 28 represents a binary zero and a black data bar 29 represents a binary one. Correspondingly, the characters represented by the bar code in FIG. 2 may be read as follows. The code contains the bits 1010 1010, in that order. Reading each four bits in reverse, i.e. right to left, the binary message 0101 0101 is found. The standard binary message 0101 represents the numeric character 5. Thus, the FIG. 2 bar code represents the characters 55.

To ease manual reading, the characters represented may be printed, as at 31, at the end of the bar code.

FIG. 2 shows a dotted line 32 superimposed on, and extending the length of, each of the eight data spaces 28. The dotted lines 32 are hereafter referred to as "strobe lines." Each strobe line 32 represents the locus of strobe pulses produced by the decoder 15 (FIG. 1) during one scanning field of the scanning device 12, as hereafter discussed. The spacing of the strobe lines 32 (which it will be understood are not part of the printed bar code) is one data interval D wide. The data interval width D is established by the decoder 15 hereafter discussed.

While attempts have been made to use an acquisition bar 26 of only one D width, Applicant finds a substantially more precise location of strobe lines 32 is achieved where the data interval width D is a submultiple of the width of the acquisition bar 26. With the eight bit, or eight data space, bar code format of FIG. 2, satisfactory precision is achieved with a 4D wide acquisition bar. However, acquisition bar width can be varied, e.g. to compliment variations in the number of data spaces. For example, sufficient strobe location precision may be available with a D or 2D wide acquisition bar for a one character (four data space) bar code.

In the FIG. 2 bar code format, the acquisition verify space 27 is D/2 wide, spacing the acquisition bar 26 from the first strobe line 32 by one interval D.

The scanning device 12 is normally oriented with respect to the scanned bar code BC such that its scanning beam moves laterally across the bar code, i.e. across the acquisition bar 26, acquisition verify space 27 and the data spaces 28 in that order. A portion of a typical scanning raster of the scanning device 12 is thus indicted in FIG. 2 by the scan lines 34. When a conventional CCTV camera is the scanning device 12, the scan lines 34 represent the path traced by the scanning electron beam of the camera across the bar code image applied to the target screen in a television camera by the optics 24 of the camera 12. For example then, where code bars, on articles presented to the camera 12, are substantially vertical as in FIG. 2, the roll orientation of the camera 12 about its optical axis normally will be such that it scans horizontally. Where, on the other hand, the code bars are generally horizontal (as in FIG. 4) the camera 12 may be rolled onto its side so it scans vertically.

While the scan lines 34 are normally perpendicular to the length of the data spaces 28 of the scanned bar code, the present invention permits accurate reading of the bar code even with variations up to ± 45° from this orientation, wherein scan lines might in a given instance cross the bar code diagonally as at 35.

The articles preferably move with respect to the camera 12 such that the camera 12 sees the code bars as moving lengthwise, i.e., more or less perpendicular to the camera scan lines. The objective is to reduce "blurring" of the bar code image in the camera, as under adverse conditions combining relatively long camera image persistence, continuous illumination of the bar code, and lateral movement of code bars along the direction of the camera scan lines. As a practical matter, article speeds past the camera will not normally be high and the present invention additionally provides several approaches to avoiding this "blur" effect in terms of use of a low persistence camera or intermittent "flash" lighting of the article, as hereafter discussed. Thus, at least in certain instances, bar code movement laterally of the bars and/or substantially along the direction of the camera scan lines is contemplated.

Figure 7:
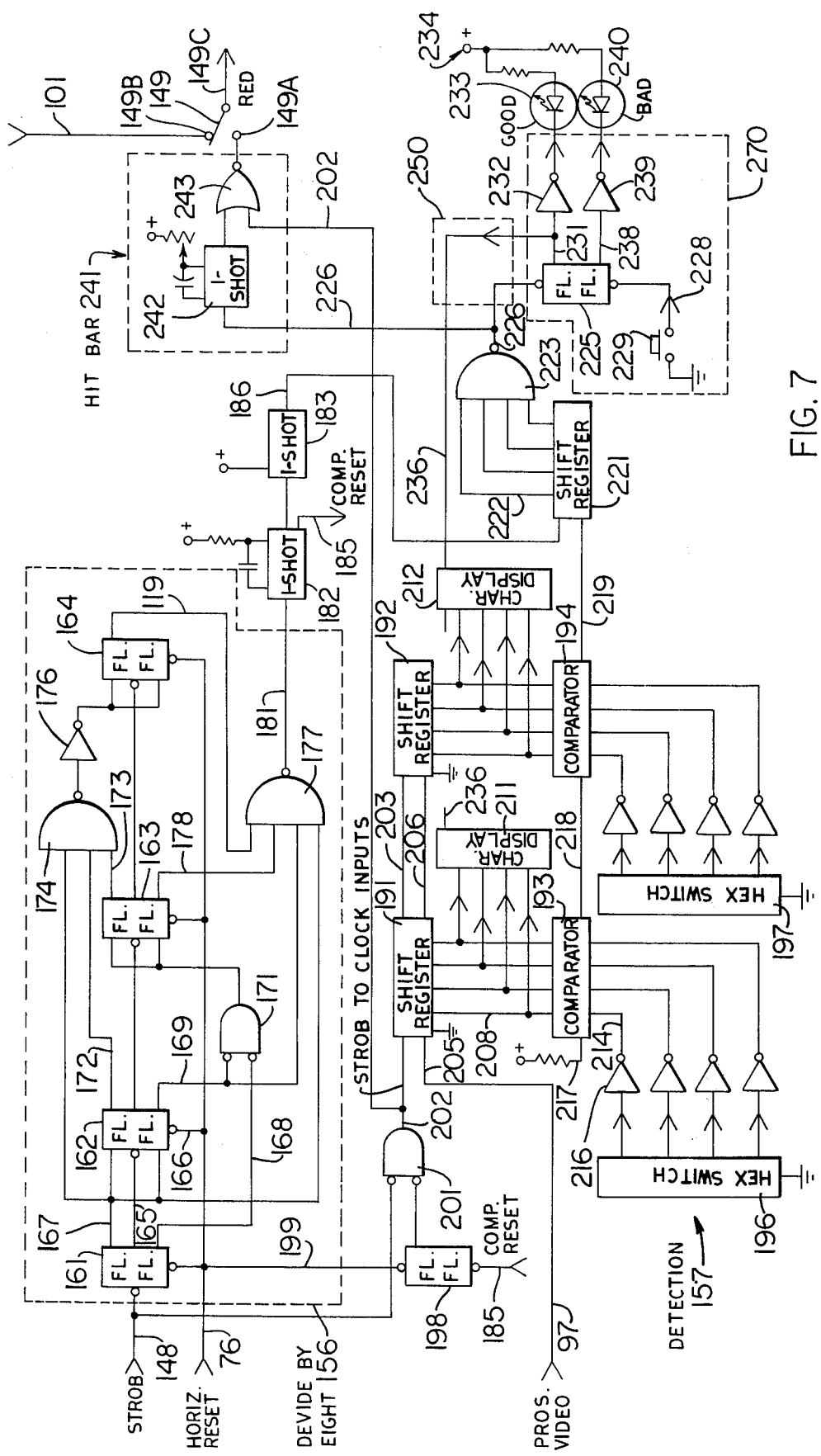
FIG. 7 is a schematic diagram of a second portion of the decoder circuitry of FIG. 1.

Given a conventional CCTV black and white camera as the scanning device 12, same normally employs horizontal line scanning with a raster pattern that comprises two interlaced scanning fields for each 525 line frame (about 212 scan lines per field). Conventionally, each scan line is 63.5 μs (microseconds) long. The bar code image in the camera 12 will normally be less than the width of a scan line. Thus, the scanning beam may move across the image of a given bar code in for example 30 to 40 μs for each scan. Thus the data interval D may typically correspond to about a 3 μs (microsecond) segment of a scan line. In contrast, the particular decoder 15 disclosed in FIGS. 6 and 7 provides strobe pulses about 75 ns (nanosecond) duration. Thus, a given data space or data bar may be about 40 times "wider" than a corresponding strobe line 32.

The following example illustrates the high scanning redundancy provided in the disclosed system. Given an article flow rate past the camera 12 of 300 per minute (5 per second) and cutting of the bar code by about half the scan lines per field, say 100 scan lines per field, the number of scan lines cutting each bar code may vary (depending on article spacing) from several hundred to several thousand, providing the stated high redundancy in scanning. Restated, given such a conventional camera, a given bar code would be cut by about 1500 scan lines where substantially contiguous bar codes are presented at the rate of 300 per minute or where bar codes occupy about 10% of the length of a conveyor line 21 passing the camera 12 are on articles traveling at about a 30 per minute rate.

In practice, bar codes tend to be less than perfectly printed on an article or label. Typical printing errors illustrated at the rightward, or last, bar of FIG. 2, include edge and internal "dropouts" 39 and 40, respectively, and edge and external "blotches" 41 and 42, respectively. Normally such errors will not be as pronounced as in FIG. 2. The probability of occurrence of such a printing error in a given scan line or series of several scan lines may be fairly small. In particular, the probability of occurrence on a strobe line 32 crossed by a series of several scan lines is very small. Thus, high scanning redundancy combined with detection of coded information (by detector 15 as hereafter discussed) only within the confines of the very narrow strobe lines 32 can virtually eliminate system code errors due to printing errors.

FIG. 3 discloses an article A6 of another typical form, here a cylindrical container. The code bars peripherally extend around the article such that orientation of the article around its polar axis 37, as it passes the scanning device, is immaterial. The FIG. 3 code represents characters 1A (binary 0001 1010). The bar code, and other information, may be directly applied to an article, instead of imprinted on a label affixed thereto.

FIG. 4 discloses an article A5, here a bottle or vial, with a label L5 printed in one relatively small area thereof with a bar code BC5 having substantially vertical bars. Typically, the bar code area is only ⅜ by ⅜ inches leaving substantial label area for other information even on a compact article.

Also, FIG. 4 modifies the FIG. 2 format, dividing the data space area into upper and lower sets of data spaces of half normal length. Without increasing the bar code area, this increases the number of data spaces (bits) from 8 to 16, the number of encoded characters from two to four, and the number of possible character combinations from 256 to 65,536. The number of scan lines cutting the data spaces of each character is halved, but this is normally easily accommodated by the mentioned high scanning redundancy. The character combination in FIG. 3 is 1A 68 (in the upper half of the code, binary 001 1010 and in the lower half, binary 0110 1000).

The bar code area may be divided more than twice, for example into thirds for encoding six characters to give 16,777,216 possible character combinations, which in many instances still retain relatively high scanning redundancy for each coded character. Rightward extension of the bar code beyond 8 bits (or data spaces) decreases decoding reliability, since any error in strobe line location is cumulative. Restated, the rightwardmost strobe line 32 is the one most subject to error in location.

FIGS. 5A and 5B show, respectively, further two and four character formats vertically split by a thin horizontal full width space. In FIG. 5B this space limits scanning of data bars for both upper and lower character pairs in the same scan line, reducing error at the transition between upper and lower character pairs. For printing uniformity the same format can be used for a two character code as in FIG. 5A. The FIG. 5B code format only partly reduces the acceptable minimum angle of skew between code and camera, here to about ± 22½°. This code format remains small, here about one-quarter inch in height. FIGS. 2-5 formats are all usable with the decoder 15 hereafter described.

The FIG. 6 portion of the decoder 15 comprises a window logic circuit 51, a clock circuit 52, a video digitizer (or noise elimination) circuit 53, an acquisition bar width compensation circuit 54 and a strobe circuit 56.

A conventional CCTV camera 12 (FIG. 1) normally includes internal circuitry for producing horizontal and vertical sync pulses to determine the transition from scan line to scan line and from field to field, respectively. Thus, the camera output line 13 carries a composite video signal comprising a raw analogue video (image representing) signal interspersed with horizontal and vertical sync pulses. Similarly, a conventional monitor, or CCTV receiver, 17 normally has sync circuitry to separate the horizontal sync signals, vertical sync signals and raw video signals incoming on composite video line 13, the separated horizontal and vertical sync signals then being employed by further conventional monitor circuitry to control scanning by the electron beams in the color tube thereof. In the present invention, the separated horizontal and vertical sync signals are additionally applied through the lines 58 and 59 to the window logic 51 of decoder 15. Also, the separated raw video (or picture information), is preferably conventionally applied directly to gun drive circuitry of the monitor 17, to display the code bars in black on the monitor screen, and is also applied through a line 61 to the decoder 15. Conventional means may be used to supply the required sync signals and route the raw video to the decoder 15.

Components of the decoder 15 receive operating potential conventionally from a suitable DC power supply not shown. Such components (e.g. multivibrators, comparators, etc.) are commercial items for which power supply requirements and connections are well known, and available from various manufacturers, and further description thereof is not believed required.

The window logic circuit 51 (FIG. 6) comprises series one-shot multivibrators 63 and 74. The one-shot 63 is driven by the horizontal sync line 58. An additional series pair one one-shot 65 and 66 is similarly driven by the vertical sync line 59. The outputs of secondary one-shots 64 and 66 are applied to corresponding inputs of each of a parallel pair of NOR gates 68 and 69 having respective output lines 71 and 72. The one-shots 63–66 are time delay devices and each has a conventional timing circuit 73 including a potentiometer manually adjustable to set the desired time delay for that one-shot.

The window logic 51 responds to the horizontal and vertical sync signals on lines 58 and 59 to set the size and location of a read window 67 (FIG. 1) within the scanning field.

In the disclosed embodiment, the camera 12 provides a conventional scanning raster of horizontal lines propagated from left to right and from top to bottom in the scanning field. The horizontal sync signal on line 58, at the beginning of a scan line, fires the one-shot 63. The one-shot 63, after its time delay, fires one-shot 64, starting its time delay. During its time delay, one-shot 64 provides an output, initially marking the leftward edge and finally marking the rightward edge of the window, to the NOR gates 68 and 69. Similarly, a vertical sync signal on line 59, occurring at the top of the scanning field, fires one-shot 65. After it time delay, the one-shot 65 fires one-shot 66 starting its time delay. During its time delay, one-shot 66 produces an output initially marking the top of the window and finally marking the bottom of the window, which output is also applied to the NOR gates 68 and 69.

In the embodiment shown, one-shots 64 and 66 each produce a logic zero output when and only when in their fired, delay timing state. In turn, NOR gates 68 and 69 uniquely produce a logic one output only in response to logic zero levels at all inputs thereof and hance only when the camera scanning beam is within the read window. Thus, with the camera scanning outside the window area, a logic zero is applied to the control line 71 for one of the monitor color guns, for example the blue gun, and the monitor picture area, except for the window, is blue. Similarly, a logic one output of NOR gate 69, when the scanning beam is within the window 67, is applied through line 72 to the clock 52 and portions of the strobe circuit 56.

Further, a horizontal reset line 76 is activated by one-shot 63 upon firing of the latter at the beginning of each horizontal scan line and until the end of its time delay.

The clock circuit 54 comprises a NAND gate 78. A timing and control network 79 comprises a series capacitor 81 and variable resistance 82 connecting the output and one input of NAND gate 78 and paralleled by a series resistor 83 and inverter 84. The remaining NAND gate input connects to the window logic output line 72.

With the scanning beam inside the window 67, the resultant high, or logic one, on line 72 enables the NAND gate 78, permitting the timing and control network 69 to pulse the NAND gate output at a rate set by variable resistor 82 and provide a series of clock pulses on line 85. A typical clock pulse rate is 15 to 25 MHz. The clock pulse output on line 85 is shut off by disabling NAND 78 in response to the low potential on window signal line 72 when the scanning beam is outside the window.

To utilize the four D width of the acquisition bar 26, the width compensation circuit 54 comprises a convention "divide by four" circuit 87 having a first flip-flop 89A driven through an inverter 90 by the clock line 85 and at one output driving a further flip-flop 89B. Further outputs, respectively of flip-flops 89A and 89B drive an inverted input AND (NOR function) gate 91 which in turn feeds every fourth clock pulse through a line 88 to the strobe circuit 56. Correspondingly, a "divide by two" circuit would be used for a two D wide acquisition bar or a "divide by eight" circuit for an eight D wide acquisition bar. The clock pulse line 85 also directly connects to a portion of the strobe circuit 56. As hereafter discussed, the strobe circuit 56 responds to the divided clock pulse rate on line 88 as the scanning beam is sweeping across the acquisition bar. On the other hand, the strobe circuit 56 responds to the full clock pulse rate on line 85 after the scanning beam leaves the acquisition bar.

The digitizer circuit 53 comprises a high gain operational amplifier 93 connected as a level comparator, with one input connected to the raw video line 61 through a low gain pre-amplifier 95. The other input of level comparator 93 receives from a voltage divider 94 a manually adjustable reference voltage level which is selectable to cause the level comparator 93 to remove the lower 15% or so of the raw video voltage amplitude, so as to screen out low amplitude noise. The preamplifier 95 and level comparator 93 both have fast rise times and the latter produces a nicely "squared" waveform as the scanning beam sweeps across the black bars and white spaces of a bar code. The resulting video waveform is substantially that shown at 98 in FIG. 2. The output of level comparator 93 is applied through an inverter 96 to processed video line 97. Such fast rise times (e.g., about 10 times faster than conventional amplifier units such as type MC 1414) tend to improve centering of the strobe lines 32 on the video code bars, particularly the rightwardmost code bars, for more accurate "reading" of the bar code, despite printing blotches and dropouts.

The processed video on line 97 is applied through an inverter 99 to a line 101 in turn connectible, through a manual selector switch 149 (FIG. 7) hereafter described, to monitor circuitry for another color gun, here the red gun. Thus, processed video, particularly a bar code scanned by camera 12, can be displayed on the screen of the monitor 17, i.e., superposed on the black raw video monitor display. The level comparator 93 is arranged such that setting of the adjustable voltage divider 94 to remove about 15% of the low level noise from the raw video signal also sets the processed video level whereby the code bar display on the monitor 17 is substantially at the transition from black to red. Therefore, the system operator can adjust the slider of the voltage divider 94 so that the bar code image display just turns from black to red and thus be assured that the proper proportion of low level noise has been removed from the processed video line 97. The comparator 93 also "squares" (or eliminates rounding of) the raw video signal at the top and bottom of pulses therein.

The strobe circuit 56 detects the time duration (width) of the acquisition bar in each scan line of a bar code by the camera 12, and from this produces a strobe pulse for each data space (here eight) at the proper subsequent locations in the scan line, the strobe pulses for a plurality of scan lines producing the strobe lines 32 in FIG. 2.

The strobe circuit 56 includes a flip-flop 103. The upper input of flip-flop 103 is set through a one-shot 105 by the onset of the window signal on line 72. The lower input of flip-flop 103 receives the processed video from line 97 through a further one-shot 106.

One enabling input of upcount control NAND gate 108 is coupled to the lower output of flip-flop 103. A further enabling input of NAND 108 receives processed video from line 97. The remaining input of NAND 108 receives clock pulses from clock 52 through the divide by four circuit 87 and line 88.

A downcount control NAND gate 109 has an enabling input connected to the upper output of flip-flop 103. The remaining input of NAND 109 is coupled to clock pulse line 85.

The output of NAND 109 appears on a downcount line 111. The output of NAND 108 connects to an upcount line 114.

An up-down counter 116 includes a pair of reversible four bit binary counters 118 and 119. The counter 118 counts up (increases the count therein) clock pulses on upcount line 114 connected thereto and downcounts (decreases the count therein) clock pulses on the downcount line 111. Downcount and upcount connection lines 121 and 122 series connect the counters 118 and 119 to define a series input eight bit reversible counter. The window signal line 72 connects through an inverter 124 to "clear" inputs 125 and 126 of the counters 118 and 119. The counters 118 and 119 also have "load" inputs 127 and 128. Parallel output and input data transfer lines 133 and 134 at each bit location in counters 118 and 119 connect to corresponding bit locations in a series pair of latch registers 131 and 132. The "load" input 136 of latch register 131 is controlled by the lower output of flip-flop 103 and a load line 137 applies the signal from line 136 to latch register 132.

A NAND gate 139 has parallel input lines 140 connected to respective counter output lines 133. The output of NAND gate 139 is through a line 142 to a NOR gate 143, having an enabling input line 144 connected to the lower output of flip-flop 103. Output from the NOR gate 143 is through a one-shot multivibrator 146 which controls pulse shape and duration on strobe line 148. The load inputs 127 and 128 of counters 118 and 119 are controlled by the strobe line 148.

The strobe line 148 is also preferably connectible through a hit bar circuit hereafter described and the manual selector switch 149 (FIG. 7) to monitor color gun control circuitry, here for the red gun to permit display of strobe pulses on the monitor screen to form the strobe lines 32 in superposed relation on the raw video display.

FIG. 7 includesa "divide by eight" circuit 156 and a detection circuit 157. Basically, the circuit 156 counts the proper number (here eight) of strobe pulses occurring during one scan of a bar code (as the camera scanning beam sweeps the eight data spaces 28 in the FIG. 2 bar code format) and signals upon completion of this count (as the scanning beam passes through the last data space 28).

The circuit 156 comprises four flip-flops 161–164 serially connected output to clock input, with the clock input 165 of first flip-flop 161 fed by the strobe line 148 from the strobe circuit 56. The horizontal reset line 76 from window logic 51, connects to the reset imputs of flip-flops 161–164, as at 166, to wipe out any count accumulated in the flip-flops 161–164 in the previous scan line and condition same for a new operation at the beginning of a given scan line.

Additionally, the circuit 156 has flip-flop data paths, as follows. The direct output of flip-flop 161 connects through data ine 167 to inputs of flip-flop 162. Correspondingly, opposite polarity data output lines 168 and 169 of flip-flops 161 and 162, respectively, are connected to a NOR gate 171 whose output is applied to inputs of flip-flop 163. Similarly, data output lines 167, 172 and 173 of flip-flops 161, 162 and 163, respectively, are applied to a NAND gate 174 whose output is applied through an inverter 176 to inputs of the flip-flop 164. A NAND gate decodes the state of flip-flops 161–164. More particularly, NAND 177 has inputs respectively connected to data output lines 167, 169, 178 and 179 of flip-flops 161-164, such data output lines being so poled that NAND 177 has all inputs at logic one, and fires, when the series of eight strobe pulses, corresponding to one scan of a bar code, have appeared on strobe line 148 following the reset pulse on horizontal reset line 76. The resulting logic zero output of NAND 177 passes on line 181 to series one-shot multivibrators 182 and 183 having respective output lines 185 and 186.

The detection circuit 157 comprises a shift register unit having series four bit shift registers 191 and 192, a comparator unit comprising corresponding four bit comparators 193 and 194, and a reference data unit comprising corresponding manually presettable hexadecimal switches 196 and 197.

A flip-flop 198 has a set input connected to the horizontal reset line 76 through line 199. A horizontal reset pulse on line 76 conditions the flip-flop 198 to enable a NOR gate 201. The remaining input of NOR 201 connects to strobe line 148. The NOR 201 drives the clock input of shift register 191, through line 202, and thence through series clock line 203 to the shift register 192. The reset input of flip-flop 198 connects to the output of one-shot 182.

The processed video line 97 connects to the data input 205 of initial shift register 191, which can overflow through series data line 206 to register 192. The logic level on the processed video line 97 at the time of each strobe pulse reads serially into registers 191 and 192 through data input 205 and line 206.

In the preferred embodiment shown, the parallel shift register output lines 208, for each shift register, drive corresponding digital display devices 211 and 212 which decode and hexadecimally display the binary representation on lines 208.

Register output lines 208 connect to parallel data inputs of comparators 193 and 194. Parallel reference inputs of the comparators receive reference logic levels stored in hexadecimal switches 196 and 197 through lines 214. In the embodiment shown, inverters 216 properly polarize the reference data applied to comparators 193 and 194.

The comparator 193 is continuously enabled by a voltage at input 217. Given a match between its data and reference inputs, comparator 193 provides a "compare" signal on a line 218 which enables the further comparator 194. Given a match between its data and reference inputs, the comparator 194 then provides a "compare" output on a line 219 to the series input of a shift register 221. The clock input of register 221 is controlled by one-shot 183.

A NAND gate 223 has parallel inputs driven by the register output lines 222. When all lines 222 have "compare" (logic one) levels, the NAND 223 fires, setting a flip-flop 225 through a line 226. This provides logic one at the upper output of flip-flop 225. By coupling this output in series with an inverter 232, signaling device 233 (here a light emitting diode (LED) visible to the system operator), and a potential source 234, the light emitting diode 233 fires to indicate that the scanned bar code is the correct one, i.e., that the article scanned by the camera is correctly labeled and coded.

If desired, the same output on flip-flop output line 231 may be applied through a further line 236 to an enabling input of each of the digital display devices 211, 212. This avoids the display of random characters as the shift registers 191 and 192 are being sequenced by strobe pulses during a scan and thus prevents the display of characters other than those corresponding to a bar code on the article as seen by the camera 12.

Similarly, the invert output 238 of flip-flop 225 connects through an inverter 239 and a further signaling device 240 to the potential source 234, whereby the light emitting diode 240 is actuated when the out put of NAND gate 223 indicates other than a "compare" for four scans in a row.

Instead of, or in addition to, the light emitting diode 233, other signaling devices or a mechanism (as at 19 in FIG. 1) for segregating satisfactorily labeled articles from the remaining articles on the processing line 21, may be controlled by flip-flop 225.

The flip-flop 225 has a reset input line 228 connectible to ground (logic zero) through a switch 229 to reset the flip-flop 225. The flip-flop 225 may be manually reset, or may be automatically reset by periodically closing the switch 229 by use of conventional sensing apparatus responsive to movement of an article out of the view of the camera 12, e.g., arranged as at 261 in FIG. 9 and hereafter discussed.

A hit bar circuit, or drop out detector, 242 includes a one-shot multivibrator actuable by the line 226 when NAND gate 223 fires, to time a delay interval extending through the next scan line. During such delay, the one-shot 242 activates (with a logic one) a NOR gate 243 whose output connects to a selectable contact 149A of the red gun switch 149. The remaining input of NOR gate 243 receives the same strobe pulses applied to registers 191 and 192, from output line 202 of NAND 201. The processed video line 101 (FIG. 6) connects to an alternately selectable contact 149B of switch 149, the movable contact of which connects to the red gun circuitry of the monitor 17 through line 149C.

With contact 149A selected, the monitor displays (here in red) the strobe pulses from line 202, and thereby in each field of scan, the several strobe lines 32 (FIG. 2) which locate the center of each data space 28. Also, given a "compare" output on comparator output line 219 for four scan lines in a row, the one shot 242 of hit bar circuit 241 causes the monitor to display a substantially full width red hit bar 244 (FIG. 1) in the following scan line. Alternately, with contact 149B selected, the monitor displays, as for set up purposes, the processed video, e.g., of a bar code facing the camera. In addition, the raw video from line 13 normally is continuously displayed by the monitor, with the above-mentioned signals superposable thereon.

OPERATION

The operation of the disclosed embodiment has been indicated above but is summarized below to assist a complete understanding of the invention.

A bar code BC (FIG. 1) on each article passing the optics 24 of camera 12 is scanned with a conventional sequence of scan lines and the resulting composite video signal is applied to the color monitor 17. The sync separation circuitry therein separates the horizontal sync signal, vertical sync signal and raw video signal which are then applied to the decoder 15 through lines 58, 59, and 61, respectively. The raw video is also displayed on the monitor.

In the decoder 15, the window legic 51 (FIG. 6) provides the horizontal reset pulse on line 76. The window logic 51 defines the read window area 67 (FIG. 1), providing a window display signal on line 71 to the monitor 17 to control one of the monitor color guns (e.g., blue) and thereby display the read window on the monitor screen as a rectangular opening (e.g. green) in a blue field. Additionally, the window logic 51 provides window signals on lines 72 to set the flip-flop 103 while the scanning beam is within the read window. When the scanning beam is outside the read window, the logic level on line 72 is applied through inverter 124 to counters 118 and 119 to lock same into a clear condition.

The raw video on line 61 passes through digitizer 53, to remove unwanted superposed noise and to improve its wave form, and is applied through processed video line 97 and one-shot 106 to the reset terminal of flip-flop 103.

Normally, the relative orientation of camera 12 (FIG. 1), the bar codes on articles A1-A4 and the direction of article movement A are such that the bar code display on the monitor 17 is a set of vertical side-by-side bars moving substantially vertically through the read window and substantially perpendicularly to the scan lines. However, for non-oriented codes, deflection of H and V may be alternated in the camera. The raw video code bars are preferably displayed in black on the monitor screen. The processed video may be superposed thereon by application through line 149C to a selected monitor color gun drive circuit, here of the red gun. This enables the operator to manually set the potentiometer 94 so that the bar code display on the monitor barely changes from black to red, which here causes the level comparator 93 to eliminate signal and noise information below a preselected amplitude level (e.g. the lower 15% of the raw video amplitude).

The camera optics 24 and window logic 51 are normally set so that the read window width slightly exceeds the expected maximum width of a displayed bar code and the height of the displayed bar code exceeds the corresponding window height. Particularly, the remaining decoder circuitry is responsive only to video information occurring within the read window and ignores video signals from the portion of the picture outside the read window. This avoids decoder error due, for example, to picture distortion near the boundaries of the picture (e.g., pincushion distortion) as well as undesirable effects of any existing flyback coil voltage transients, or other noise as may appear in the raw video adjacent the margins of the scanning field.

As the scanning beam enters the read window, the clock 52 initiates production of clock pulses due to the window signal on line 72. The divide by four circuit 87 thus initially feeds every fourth clock pulse through line 88 to the input of NAND gate 108. The window signal is passed by line 72 and one-shot 105 to the set terminal of flip-flop 103, whose upper output is thus placed at a logic zero level, holding the gate 109 disabled. Correspondingly, the lower output of set flip-flop 103 is at a logic one, providing the first of the required two enabling inputs to NAND gate 108.

As the scanning beam encounters the acquisition bar 26 of a bar code, the resulting white to black transition due to the inverter 96 raises the level on processed video line 97 from logic zero to logic 1 and provides the second required enabling input for NAND gate 108. NAND 108 then conducts clock pulses through the upcount input line 114 of counter 118, 119. The counter thus counts up clock pulses from zero as the scanning beam traverses the acquisition bar 26.

The logic one on the lower output terminal of flip-flop 103 also actuates the load input 136 of shift registers 131 and 132. Consequently, the instantaneous count on the counter output lines 133 passes in parallel into latch registers 131 and 132 for storage.

As the scanning beam leaves the black acquisition bar 26 and enters the white acquisition verify space 27 of the scanned bar code, the resulting black to white transition in the processed video is applied through signal shaping one-shot 106 and resets flip-flop 103, shifting its lower output to a logic zero and its upper output to logic 1.

The resulting logic zero on load line 136 freezes the then existing upcount stored in latch registers 131 and 132, which store the remainder of the line of scan across the bar code. The logic zero at the lower output of flip-flop 103 also disables NAND gate 108 so no further clock pulses appear on upcount line 114.

On the other hand, the logic one on the upper output of flip-flop 103 enables NAND gate 109 which now passes clock pulses from line 85 through downcount line 111 to counters 118 and 119. Thus, counters 118 and 119 downcount at the normal clock rate (rather than at the prior one-quarter clock rate used in upcounting during scanning of the acquisition bar).

Downcounting continues as the scanning beam moves rightwardly (FIG. 2) away from the acquisition bar 26, across the acquisition verify space 27 and into the first data space 28. When counters 118 and 119 have downcounted to zero, all the counter output lines 133 carry logic 1 levels (the counter outputs 133 are inverts). Connecting parallel lines 140 thus place all inputs of NAND gate 139 at a logic one level when the counter has downcounted to zero. Consequently the NAND 139 now fires providing a logic zero through line 142 to NOR gate 143.

The NOR gate 143 was previously provided an enabling zero input through line 144 from the lower flip-flop output 103, at the time of the black to white transition accompanying movement of the scanning beam from the acquisition bar 26 into the acquisition verify space 27 of the code. Consequently, firing of NAND 139 fires NOR gate 143, providing logic one output therefrom to one-shot 146. The one-shot 146 thus provides a strobe pulse, of proper shape and duration, on strobe line 148. This first strobe pulse occurs when the scanning beam was moved one D rightwardly beyond the acquisition bar 26 and it marks the location at which the decoder 15 expects to find the center of the first data space 28 in the printed bar code scanned by the camera 12.

This strobe pulse also activates the load terminals 127 and 128, causing a substantially instantaneous parallel reading of the count, stored in shift registers 131 and 132, through parallel lines 134 into counters 118 and 119. By means of this "jam transfer," the counters 118 and 119 are immediately returned to a count corresponding to the scanning time for one D interval. The next clock pulse applied through AND gate 89, line 85, NAND gate 109 and downcount line 111 initiates a second strobe pulse producing cycle, namely: downcounting to zero by counters 118 and 119, firing of NAND gate 139 and NOR gate 143, shaping of the new strobe pulse by one-shot 146 and tripping of the counter load inputs 126 and 128 by the strobe pulse.

This cycle repeats to produce at least as many strobe pulses as the number of data spaces provided in the bar code format, here eight.

During the repetition of this strobe pulse cycle, the outputs of flip-flop 103 remain in their last mentioned state, the stored count remains frozen in shift registers 131 and 132, NAND gate 108 remains disabled, NAND gate 109 remains enabled to flow clock pulses at normal clock rate, and NOR gate 143 remains enabled.

This strobe pulse cycle continues until the scanning beam has entirely passed the bar code and reaches the end of the read window, as determined by cessation of the window signals on lines 71 and 72 from the window logic 51. This stops the clock 52, by disabling gate 78, and applies a "clear" input at terminals 125 and 126 setting counters 118 and 119 to zero. In the next scan line, occurrence of the next window signal on the set input of flip-flop 103 applies a logic one to the load terminal 136 of latch register 131. This clears the prior stored upcount from latch registers 131 and 132, by loading same with the zero count in cleared counters 118 and 119. Thus, the apparatus of FIG. 6 is conditioned to repeat its above-described sequence as the camera scanning beam moves toward the acquisition bar in such next scan line.

In FIG. 7, the divide by circuit 156 is preconditioned for counting strobe pulses by the horizontal reset pulse on line 76 early in each scan line. This horizontal reset pulse also sets flip-flop 198, which then enables NOR gate 201 to transmit and invert strobe pulses from strobe line 148 to the clock input of shift registers 191 and 192.

For each scan line, the divide by circuit 156 counts the first eight strobe pulses (one for each data space 28 in the bar code format) as such strobe pulses are applied to the clock inputs of shift registers 191 and 192. The amplitude of the processed video on line 97, at the time of each strobe pulse, is thus clocked as a data bit (logic 1 or zero) into the series shift register data input 205. The comparators 193 and 194 maintain a running comparison of the instantaneous data in shift registers 191 and 192, with the preselected reference data in hexadecimal switches 196 and 197.

After the divide by circuit 156 counts the preselected number of strobe pulses (here eight) on a given scan line, it fires one-shots 182 and 183. The first of these resets flip-flop 198, disabling NOR 201 and preventing any further pulses on strobe line 148 from entering the clock inputs of shift registers 191 and 192, prior to a new horizontal reset pulse on line 78. This freezes the bar code data present in such registers as the scan beam passes beyond the bar code and prevents spurious (noise) inputs at the data input terminal 205 of shift registers 191 and 192 while the camera beam is scanning subject matter other than the bar code. If the bar code bit pattern in shift register 191 equals the reference pattern stored in hexadecimal switch 196, the first character comparator 193 provides an enabling pulse to the second comparator 194, which, given a match in data in register 192 and hexadecimal swith 197, in turn provides a "compare" pulse on line 219. If the pattern frozen in shift registers 191 and 192 does not compare to, or match, that in reference storage 196 and 197, a "noncompare" logic level appears on line 219. The load pulse from one-shot 183, on line 186, shifts the resulting "compare" or "noncompare" signal for this scan into shift register 221, advancing the extisting bits therein one step.

In the embodiment shown, the shift register 221 holds comparison bits for four successive scan lines. A match of processed video and reference data patterns on any four successive scan lines of a given bar code fires NAND gate 223, setting flip-flop 225, causing a decimal display of the characters represented by the bar code on decimal display means 211, 212, and actuating the "goods" indicator 233, and/or causing a suitable routing of the thus properly coded article or actuating some other desired device. On the other hand, when the criterion for a properly coded arcicle has not been met, the "bad" indicator 240 is actuated and other appropriate control or indicating measures can be taken.

During actual inspection of coded articles, the switch 149 is normally positioned to select contact 194A. This superposes on the raw video monitor display the strobe pulses from line 202, which for each scanning field form the strobe lines 32. Thus, the operator can at any time visually check the registration of strobe lines on the data spaces 28 of a displayed bar code being viewed by the camera 12.

With the selector switch 149 so positioned, the hit bar circuit 241 additionally superposes a horizontal hit bar on each scan line following determination by NAND gate 223 that a "good", or properly matching bar code is being scanned. While variations in the criterion for a "good" code are contemplated (such as two or eight successive scan lines each producing a "compare" signal on line 219), the above example of "compare" signals for each of four successive scan lines is preferred, and a hit bar is thus here displayed on the monitor in the scan line following four successive "compare" signal producing scan lines. The hit bar display provides an immediate visual indication to the operator that the scanned article carries the desired bar code. The hit bar display also provides insights as to bar code printing quality. Also, the monitor displays above-discussed permit the operator to detect whether the system is operating properly.

For example, with a theoretically perfect, correct bar code being scanned, the monitor would here display a hit bar in the fifth scanning line traversing the bar code, i.e., near the top of the bar code display with no further hit bars superposed on lower portions of the code bars. As to the latter, an unbroken succession of "compare" signals applied to shift register 221 continues to hold the output of NAND gate 223 at logic zero. Thus, though the one shot 242 times out at the end of the initial hit bar, it is not reset and cannot produce a new hit bar signal through NOR gate 243 until reset by a discontinuity in or following the bar code. Thus, a printing defect (e.g., drop out or blotch) at any point in the bar code results in a "noncompare" (logic zero) signal at one input of NAND gate 223 changing its output to a logic one and resetting the one-shot 242. The latter will give another hit bar in response to the next occurrence of four "compare" scans a row.

Thus, several hit bars superposed on a given bar code display field indicate that the high scanning redundancy of the apparatus is being utilized, indicate how much scanning redundancy was required in that instance to establish the scanned code as correct, and visually suggest presence or absence of printing flaws displayed in the bar code. Entire absence of a hit bar display provides a secondary indication that the scanned bar code is an incorrect one. Alternately, appearance of a hit bar only near the end of scanning of a bar code may suggest improper set up of the system.

Although operation of the decoder circuitry of FIGS. 6 and 7 has been described in terms of the FIG. 2 two character code operation is similar for the modified FIG. 5A two character format. The primary difference for the latter is that the central horizontal space separating the upper and lower portions of the code format causes the decoder to treat the upper and lower halves as two separate codes. A "good" indication at indicator 233 and a hit bar display on the monitor would be expected near the top of both the upper and lower halves of the code format, assuming a correct code free of printing flaws. This assumes horizontal line scanning progressing from top to bottom.

In one embodiment, the camera 12 was a model VCS-3000 manufactured by Sanyo of Japan. The color monitor was a "Trimitron" model manufactured by Sony of Japan.

In FIGS. 6 and 7, for one embodiment, the following TTL logic components were employed and are variously available from Motorola, Signetics, Fairchild, etc. of the U.S.A.

One-shot multivibrators: type 74121
   Flip-flops (FIG. 6): type 74S112
   Flip-flops (FIG. 7): type 7476
   Counters: type 74193
   Latch registers (FIG. 6): type 7475
   Shift registers (FIG. 7): type 7495
   Comparators: type 7485
   Decimal display devices 211 and 212: type 5082-7340
   Preamplifier and comparator amplifier: type LH0032 (National semiconductors)

The inverters, AND gates, NAND gates, and NOR gates may be of any desired type compatible with a given supply voltage.

MODIFICATIONS

Figure 8:
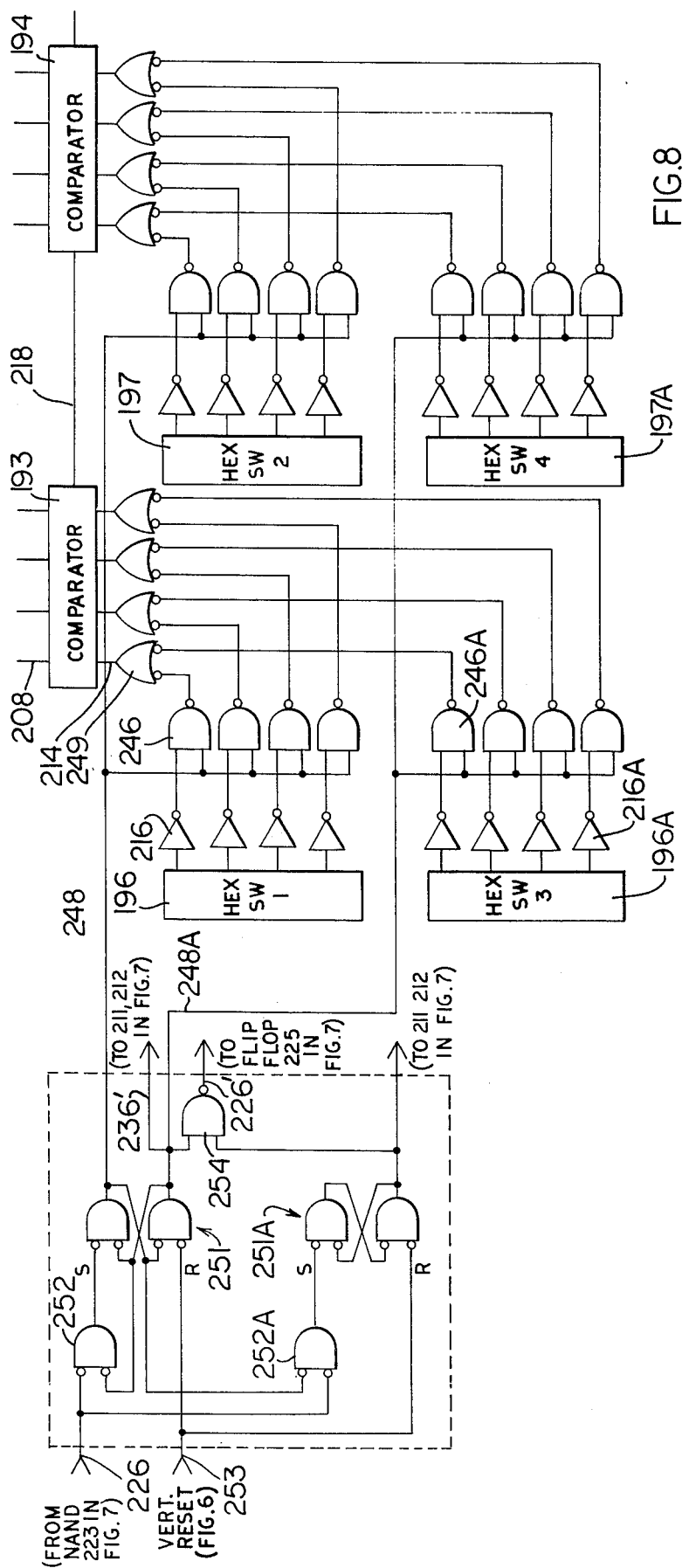
FIG. 8 discloses a modification of FIG. 7 for reading the modified FIGS. 4 and 5B bar codes.

The FIG. 7 detection circuit 156 can be modified for use with the four character code of FIGS. 4 and 5D, as shown in FIG. 8. In FIG. 8, the outputs of the hexadecimal switches 196 and 197 are connected to corresponding inputs of respective comparators 193 and 194 each through a series path comprising one of the inverters 216, a NAND gate 246, an inverted input OR gate 247 and the corresponding comparator reference input line 214, hexadecimal switches 196 and 197 storing the binary reference code for the upper two characters of the four character bar code. Similar third and fourth hexadecimal switches 196A and 197A, which store the binary reference code for the lower two characters of the four character bar code, have their outputs also connected to the inputs of comparators 193 and 194, respectively, each through a series path comprising an inverter 216A, a NAND gate 246A, the remaining input of the corresponding inverted input OR gate 27 and the corresponding comparator input line 214. The enabling inputs of NAND gates 246 and 246A connect to corresponding enable lines 248 and 248A from a character control circuit 250 comprising a pair of RS flip-flops 251 and 251A.

The set imputs of flip-flops 251 and 251A connect to the output line 226 of "good-bad" NAND 223 of FIG. 7 through inverted input AND gates 252 and 252A, respectively, the enabling inputs of the latter being coupled to the inverted and noninverted outputs, respectively, of RS flip-flop 251. The reset inputs of flip-flops 251 and 251A both connect to the vertical reset line 253, from the window logic 51 of FIG. 6. The true and inverted outputs of flip-flop 251 respectively drive aforementioned NAND enable lines 248 and 248A. Also, the inverted outputs of flip-flop 251 and 251A respectively connect through lines 236' and 236A' to the "hold" terminals of the character display units 211 and 212 of FIG. 7, in place of line 236 of FIG. 7. Additionally, such inverted outputs of flip-flops 251 and 251A drive respective inputs of a NAND gate 254, the output 226' of which connects to the upper input of flip-flop 225 of FIG. 7 in place of line 226. The character control circuit 250 of FIG. 8 in effect replaces the portion of FIG. 7 indicated, for ease of reference, by the broken line box 250.

At the beginning of each scanning field, the vertical reset signal appears on line 253 until scanning beam enters the read window 67 (FIG. 1). This vertical reset signal resets the flip-flops 251 and 251A (FIG. 8). The flip-flop 251 then provides an enabling logic one on line 248 to the enabling inputs of NAND gates 246 to apply the binary reference code from hexadecimal switches 196 and 197 through inverters 216 (which act as buffers), gates 246 and 247, and lines 214 to the reference inputs of comparators 193 and 194, permitting the latter to compare the binary reference data for the upper two characters of the reference bar code with scanning data obtained from scanning the upper half of the article-borne four character bar code (as in FIGS. 4 and 5B) by camera 12. At this point, flip-flop 251 (FIG. 7) is applying a disabling logic zero through line 248A to the NAND gate 246A, preventing application of the binary reference data in lower hexadecimal switches 196A and 197A to the comparators 193 and 194.

When the comparators 193 and 194 sense a match between the reference data from upper hexadecimal switches 196 and 197 and the incoming scanning data on four consecutive scans, the NAND gate 223 (FIG. 7) fires, as above-described, applying a logic zero through line 226 to the connected inputs of gates 252 and 252A (FIG. 8). The gate 252 then sets flip-flop 251, reversing its output states. The resulting logic zero on line 248 disables NAND gates 246, disconnecting the hexadecimal switches 196 and 197 from the comparators 193 and 194. On the other hand, the resultant logic one on line 248A now enables the lower set of NAND gates 246A applying the binary reference data from the lower pair of hexadecimal switches 196A and 197A for the first time to the comparators 193 and 194 to enable same to determine the correctness of the lower half of the scanned bar code. However, the mentioned firing of NAND 223, which caused gate 252 to set flip-flop 251, does not fire gate 252A and its flip-flop 251A remains reset. This is because of the opposite logic signals applied to the enabling inputs of gates 252 and 252A by the flip-flop 251 outputs when NAND gate 223 fired.

Line 236' is conventionally wired to the character display units 211 and 212 caused same to display and hold the upper two characters of the scanned bar code in response to the logic one appearing thereon when flip-flop 251 becomes set as above described.

The camera 12 continues to scan downwardly along the opposed bar code (with NAND gate 223 deactuating, due to lack of "compare" signals). The scanning beam soon reaches the lower half of the scanned bar code. When the comparators 193 and 194 sense a match on four consecutive scan lines, between the lower half reference code data from lower hexadecimal switches 196A and 197A and the data from scanning the lower half of the bar code, the NAND gate 223 again fires. The resulting logic zero on line 226 does not affect previously set flip-flop 251, but (in view of the set condition of the latter) now fires gate 251A to set flip-flop 251A, providing a logic one on line 236A'. Line 236A' is also connected to the character display units 211 and 212 in a conventional manner and now causes same to drop their prior display and now display the characters encoded by the lower half of the scanned bar code. With both of flip-flops 251 and 251A now set, NAND 254 fires and through line 226' actuates the flip-flop 225 (FIG. 7), to actuate the "good" indicator 223. This indicates that all four characters of the scanned bar code are correct and are correctly arranged with respect to each other in the scanned bar code format. The FIG. 8 apparatus retains its last mentioned state until the beginning of a new scanning field, wherein the above-described cycle repeats. Thus, the FIG. 8 system must initially find correct the first two (upper) characters in the scanned code in a given field, and only thereafter can it investigate the second two (lower) characters of the four character code being scanned. Thus, the FIG. 8 apparatus cannot provide a "good" signal to the flip-flop 225 if any of the four characters in the code are incorrect or wrongly placed within the code.

While the disclosed embodiments employ hexadecimal encoding (decimal characters 0–9 and letters A–F), other encoding schemes may be used as well.

Figure 9:
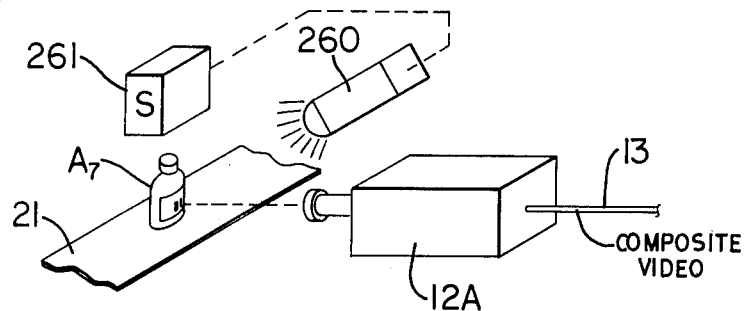
FIG. 9 discloses a modified scanning apparatus.

The FIG. 9 variation on FIG. 1 is particularly useful when widely spaced but very rapidly moving bar codes are presented to the camera. Instead of the low persistence camera 12 of FIG. 1 (e.g., Tivicon), a relatively long persistence camera 12A (e.g., Vidicon) is used in combination with a conventional high speed flash, or strobe, lamp 260, capable of providing a short duration (e.g., 1/5000 second) light flash to illuminate an article A7 on processing line 21. The flash of strobe lamp 260 may be initiated by sensing the presence of the article A7 in front of the camera 12A, by conventional sensing means schematically indicated at 261. The brief light flash by strobe lamp 260 loads, or stores, the image of the bar code area of article A7 onto the target screen of the camera 12A. The electron beam of the camera 12A then conventionally scans the stored image several (e.g., 7 to 9) times, as the article A7 moves past and away from the camera 12A. This provides, for a bar code on a given article, several fields of composite video on line 13, for processing and detection as above-described with respect to FIGS. 1–7.

Figure 10:
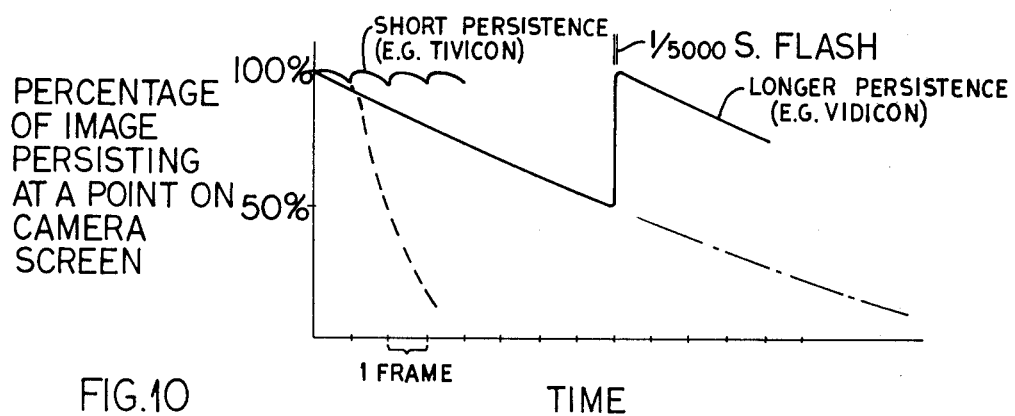
FIG. 10 graphically displays persistence characteristics of Vidicon and Tivicon CCTV cameras.

FIG. 10 compares typical image persistence characteristics of the FIG. 1 Tivicon and FIG. 9 Vidicon and clearly indicates the longer persistence of the Vidicon. The renewal of the image at a given point on the Tivicon screen, for each frame, is contrasted with storing an image at a given point on the Vidicon for several scanning frames. The updating effect of the strobe lamp flash on a Vidicon image point is shown. Thus, an article can move past the camera 12A at extremely high speed and be instantaneously "frozen" by the flash of the strobe lamp. With slower moving, more closely spaced articles, Tivicon camera 12 (FIG. 1) eliminates the need for timed flash illumination, and hence units 260 and 261.

Figure 11:
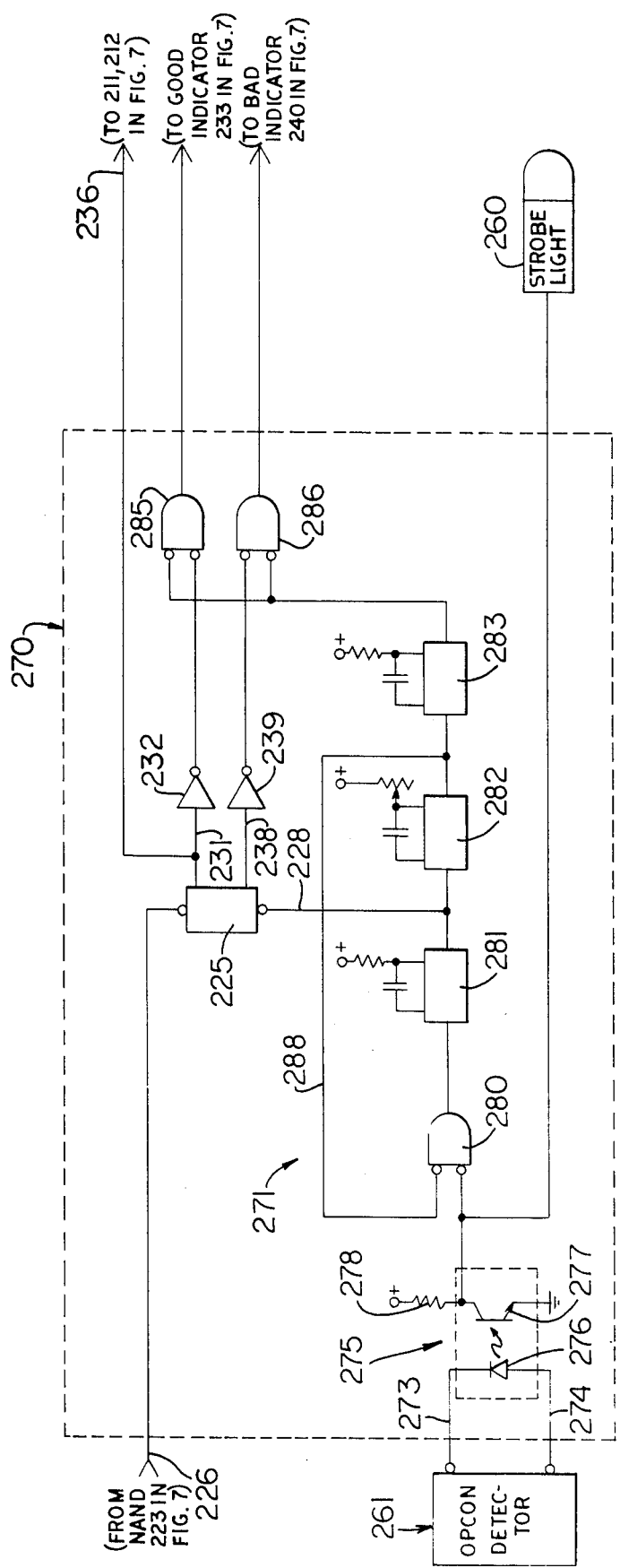
FIG. 11 discloses a modified output circuit usable with the FIG. 9 article sensing apparatus.

FIG. 11 discloses a modified output circuit 270 particularly usable with an article sensing device, as at 261 in FIG. 9 and which replaces the portion of FIG. 7 indicated by the broken line box 270 in FIG. 7. The article sensor 261 may be of any convenient type, here for example an Opcon detector, which when an article is in front of the camera 12A (FIG. 9) produces an output across lines 273 and 274. The sensor output passes, here through an optical isolator 275 comprising a light emitting diode (LED) 276 and a light sensing transistor 277 in series with a bias resistor 278 between a d.c. source and ground, to the strobe light 260 and to an inverted input AND gate 280. The AND gate 280 drives a one-shot multivibrator 281 having an output connected through line 228 to the reset input of the "good-bad" flip-flop 225 and also to a further one-shot 282. The output of one-shot 282 connects back to the enabling input of AND gate 280 and also drives a third one-shot 283.

A pair of inverted input AND gates 285 and 286 are interposed between, respectively, the inverter 232 and "good" indicator 233 and the inverter 239 and "bad" indicator 240 of FIG. 7. The enabling inputs of gates 285 and 286 are controlled by one-shot 283.

When an article moves into position in front of camera 12A (FIG. 9) sensor 261 activates the optical isolator 275. This flashes the strobe lamp 260 to briefly illuminate the bar code on the article and store the image of the bar code on the target screen of camera 12A for decoding as above-described. Simultaneously, the optical isolator 275 activates the one-shot 281 through AND gate 280. The one-shot 281 provides a pulse of sufficient duration on line 228 to reset flip-flop 225, conditioning it for activation by line 226 should (as described with respect to FIGS. 6 and 7) the scanned bar code be a correct one. The end of the pulse from one-shot 281 actuates one-shot 282 which through line 288 disables gate 280 to preclude, for the delay timed by one-shot 282, any further reset inputs to flip-flop 225, as due to further activations of detector 261 for any reason. This delay provides sufficient time for storing the bar code image on the target screen of Camera 12A and for processing of the resultant video by the decoder of FIGS. 6 and 7 as above-discussed. If the bar code on the article is correct, the resultant "good" signal (logic zero) on line 226 can set the flip-flop 225 to its "good" state without interfering reset signals on line 228. Thus the duration of the delay pulse on line 288 is preferably equivalent to between one and several scanning fields.

During the blocking delay of one-shot 282, setting of flip-flop 225 by firing of NAND 223 activates line 236 (as above-discussed with respect to FIG. 7) to cause displays 211 and 212 to display the characters of the scanned bar code.

The end of the delay timed by one-shot 282 causes the oneshot 283 to apply an enabling pulse to the gates 285 and 286, which then actuate the "good" indicator 233 or "bad" indicator 240 of FIG. 7 depending on state achieved by flip-flop 225, i.e. depending on whether NAND 223 has determined that the scanned bar code is a "good", or correct, one during the blocking delay of one-shot 282.

While the FIG. 11 circuit has been described above in connection with FIG. 7, and hence with respect to a two character bar code, it is also usable with the modification of FIG. 8, for processing four character codes. Also the FIG. 11 circuit, without the strobe light 260, may be employed with a low persistence, "nonstoring" camera, such as the Tivicom above discussed.

The delayed timing units 281–283 of output circuit 270, by limiting the times during which flip-flop 225, displays 211, 212 and indicators 233, 240 can be operated, substantially reduces their opportunity for falsely indicating a "good" code. This adds an extra measure of reliability to the system.

The embodiments of the invention in which an exclusive property or privilege is claimed are defined as follows:

1. A self-clocking bar code bearing article for identification by apparatus including a device capable of line scanning the bar code area on said article, comprising:

a preselected number of rectangular parallel data spaces disposed in contiguous, side-by-side relation and defining a rectangular portion of said area, each data space being one data interval D in width, wherein the longitudinal center lines of each adjacent of data are separated by a single data interval D;

one or more data bars of width D each normally fully occupying and normally confined to a corresponding one of said data spaces and distributed among said data spaces in a preselected pattern, which pattern encodes at least one corresponding character in said portion, said data spaces being oriented for line scanning thereacross, by said device, from a first said data space at one side of said portion to a last said data space at the opposite side of said portion;

a rectangular acquisition bar of multiple D width parallel to and sidewardly offset from said data spaces, said acquisition bar being spaced upstream along the lines of scan from said first data space by an open rectangular acquisition verify space which is of preselected width K, said width K lying in the range D/2 to one D, inclusive, said bars being distinguishable from said spaces by said scanning device, wherein the bar code across its width consists of in series said multiple D width acquisition bar, said acquisition verify space and said side-by-side contiguous data spaces, with one or more of said data spaces occupied by data bars, the time required to scan across said acquisition bar being subdividable by an integer to establish each of a succession of time intervals each equal to the time required to scan a width D and thereby enable determination of the time at which the line of scan will cross each successive data space center line, whereby the bar code is self-clocking.

2. The article of claim 1, in which said bar code area is subdivided lengthwise by at least one unoccupied separation space extending widthwise across the bar code area to provide at least a pair of sub-areas, each sub-area having a longitudinally foreshortened acquisition bar and one or more longitudinally foreshortened data bars, the foreshortened acquisition bars and data spaces of said sub-areas being longitudinally aligned, the pattern of foreshortened data bars above said separation space being independent from the pattern of data bars below said separation space to enable encoding of different characters above and below said separation space, the height of said separation space exceeding the thickness of a scan line but being less than the height of each of the adjacent sub-areas.

3. A bar code reading system including a bar code emplaceable on an article, the bar code having an acquisition bar followed by a succession of uniform data spaces occupiable by a pattern of data bars to encode information characters, the system comprising:

scanning means for line canning said bar code and producing a video signal having transitions corresponding to transitions between bars and spaces of the scanned bar code;

decoder means responsive to said video signal and synchronized with said scanning means for identifying the bar code on the article being scanned, said decoder means including a source of clock pulses of fixed frequency independent of transitions in said video signal, strobe pulse means including means for counting clock pulses produced as said scanning means scans across said acquisition bar to establish a clock pulse count proportional to the width of said acquisition bar, and means responsive to said count and subsequent clock pulses produced after said scanning means leaves said acquisition bar for in turn producing a sequence of strobe pulses (1) spaced by identical clock pulse quantities proportioned to said count to define uniform time intervals related to the width of said acquisition bar and (2) occurring substantially as the line of scan crosses the centers of successive data spaces of the bar code, comparison means responsive to said strobe pulses and video signal for comparing a pattern of video signal values coincident with said pulses to a stored reference pattern of values corresponding to a correct bar code and for producing a "compare" output when the two patterns correspond, output means responsive to signals from said comparison means meeting a preselected criterion for indicating whether the scanned bar code is a correct one.

4. The system of claim 3, in which said decoder means includes window logic means responsive to horizontal and vertical sync signals timing the scan lines and scanning fields, respectively, of said scanning means for generating a window signal corresponding to a window area within the scanning field, and for enabling said clock pulse source and strobe pulse means only when said scanning means is scanning within said window area.

5. The system of claim 3, in which said decoder further includes processed video means which comprises a series connected, fast rise time preamplifier and level comparison means responsive to the raw video component of the video signal from said scanning means for reducing residual noise components therein and improving the waveform thereof to produce a processed video signal.

6. The system of claim 3, in which said decoder means further includes a width compensation means incorporating a pulse frequency division means as a first clock pulse path from said clock pulse source to said strobe pulse means and a second, direct path from said clock pulse source to said strobe pulse means, the ratio between the clock source frequency and divided clock pulse frequency being equal to the ratio between the acquisition bar width and the width of a given said data space of said bar code.

7. The system of claim 6 in which said strobe pulse means comprises up-down counter means, and further comprises first gate means and second gate means interposed between said first and second clock pulse paths, respectively, and said counter means for causing said counter means to count clock pulses in respective first and opposite counting directions, and gate control means responsive to first and second video signal transitions corresponding respectively to the beginning and end of a scan across said acquisition bar for (1) enabling said first gate means at said first video transition to count divided frequency clock pulses in said counter means, and (2) at said second transition disabling said first gate means and enabling said second gate means to reverse direction count source frequency clock pulses in said counter means, said strobe pulse means being responsive to return of said counter means to its count at the time of the first video transition for producing a first strobe pulse corresponding in time to crossing of the center of the first data space of said bar code by the line of scan.

8. The system of claim 3, in which the strobe pulse means includes a reversible counter means having a first series input for counting in one direction and a second series input for counting in the opposite direction and a plurality of parallel inputs and outputs corresponding in number to the counting capacity of said counting means, storage means connected to said parallel counter means inputs and outputs for substantially instantaneously parallel storing a count appearing on said parallel counter means outputs and for substantially instantaneously applying a stored count to said parallel counter means inputs, gate means responsive to said video signal and said clock pulses for loading clock pulses into said counter means at said first series input during scanning across said acquisition bar and causing said storage means to store the count thus accumulated by said counter means, control means responsive to the video signal transition as the line of scan leaves the acquisition bar causing said gate mean to apply clock pulses to said second series counting means input instead of said first series input and therewith for causing said counter means to count the number of pulses stored in such storage means, means responsive to completion of counting of said stored count for producing a first strobe pulse corresponding in time to crossing of the center of the first data space of the bar code by said scanning means, means responsive to said strobe pulse causing said counter means to again count clock pulses at said second input in number equal to the number in such storage means so as to produce a second strobe pulse and thereafter a further succession of strobe pulses, said strobe pulses corresponding in time to crossing by the scanning means of successive data space centers in the bar code being scanned.

9. The system of claim 8, in which said decoder means further includes window means synchronized with scanning means for establishing an active window spaced within the scanning field of said scanning means and connected to said strobe pulse means for blocking production of further strobe pulses as said scanning means scans from within said window to a portion of said field outside said window.

10. The system of claim 3, in which said decoder means includes strobe pulse counting means connected to said strobe pulse means and synchronized with said scanning means for producing an output when the number of strobe pulses produced for a line of scan reaches the number of data spaces in the bar code, said comparison means having means responsive to said strobe pulse counting means output thereafter for blocking application of further strobe pulses to said comparison means during that line of scan, said output means being additionally responsive to said output of said strobe pulse counting means for enabling the latter to respond to a "compare", or "noncompare", output from said comparison means subsequent to a scan across said bar code by said scanning means.

11. The system of claim 3, in which said output means comprises a shift register having a series input for receiving a "compare" or "noncompare" signal from said comparison means after each scan across said bar code, said shift register having a plurality of parallel outputs, gate means connected to said parallel outputs and solely responsive to a "compare" signal on each of said outputs, indicative of substantial identity between the stored and reference data compared by said comparison means in each of a corresponding number of successive scans across the bar code, for producing a "good" output, said "good" output indicating the scanned bar code is correct.

12. The system of claim 11, in which said output means further includes bistable means responsive to a "good" signal from said gate means for changing from a first to a second state, indicator units connected to said bistable means and respectively responsive to said first and second states thereof for indicating respective "bad" and "good" comparison results, said system further including display means capable of displaying characters encoded by the pattern of data bars and data spaces in the bar code being scanned, said display means having inputs receiving said pattern of video signal values and having an enabling input connected to said output means for displaying the characters encoded in the scanned bar code in response to said "good" indication.

13. The system of claim 3, in which said data spaces of said bar code are parallel and arranged in side-by-side contiguous relation and of equal width D, said acquisition bar paralleling said data spaces and preceding same along the line of scan of said scanning means, said bar code comprising first and second parts, each part having an acquisition bar and succeeding set of data spaces, said bar code parts being stacked such that the acquisition bar and data spaces of the second part longitudinally align with the acquisition bar and corresponding data spaces of the other part, wherein data bars are independently arrangeable in the data spaces of first and second code parts to encode N characters in each code part and such that the entire bar code encodes at least two N characters, said code parts thus being scanned one after the other in each scanning field of the scanning means.

14. The system of claim 3, in which said comparison means comprises a comparator unit having N parallel video data inputs for receiving binary bits corresponding to the arrangement of bars and spaces in said first code part and then in said second code part, as said code parts are crossed by successive scan lines of said scanning means, said comparator unit further having N parallel binary reference data inputs for receiving stored binary reference data corresponding to correct bar code characters, a first binary reference data storage bank for the first N characters of the correct bar code, a second binary reference data storage bank containing binary reference data for the second N characters of the correct bar code, first and second reference data gating means respectively interposed between parallel reference data inputs of said comparator unit and parallel data outputs of said first and second reference data banks, and reference control logic means interconnected with said output means and responsive to an indication thereof that one part of the bar code is correct for causing the reference data bank for the other code part to be connected to said comparator unit.

15. A bar code reading system including a bar code emplaceable on an article, the system comprising:
scanning means for line scanning said bar code and producing a video signal having transitions corresponding to transitions between bars and spaces of the scanned bar code;
decoder means responsive to said video signal and synchronized with said scanning means for identifying the bar code on the article being scanned, said decoder means including
comparison means for comparing a pattern of video signal values from the scanned bar code to a stored reference pattern of values corresponding to a correct bar code, and
output means responsive to signals from said comparison means meeting a preselected criterion for indicating whether the scanned bar code is a correct one;
said bar code comprising first and second parts, said bar code parts being stacked, wherein data bars are independently arrangeable in the data spaces of first and second code parts to encode N characters in each code part and such that the entire bar code encodes at least two N characters;

said comparison means comprising a comparator unit having a first binary reference data storage bank for the first N characters of the correct bar code, a second binary reference data storage bank containing binery reference data for the second N characters of the correct bar code, first and second reference data gating means respectively interposed between parallel reference data inputs of said comparator unit and parallel data outputs of said first and second reference data banks, and reference control logic means interconnected with said output means and responsive to an indication thereof that one part of the bar code is correct for causing the reference data bank for the other code part to be connected to said comparator unit;

said reference control logic means including first and second bistate means, said first bistate means having first and second opposite polarity outputs respectively connected to enabling inputs of said first and second reference data gating means for initially enabling said first gating means and disabling said second gating means to cause said comparator unit to initially compare the data of said first reference bank with video data from scanning of the first part of a bar code, said output means providing a "good" indication when the scanned part of the bar code is correct, said first bistate means being responsive to a said "good" indication resulting from matching of said first bank reference data and video data from the first bar code part for reversing its output state and thereby disabling said first reference data gating means and enabling said second reference data gating means, whereby the comparator unit will thereafter compare second bank reference data with subsequent incoming video data, means responsive to said state change of said first bistate means and a subsequent second "good" indication by said output means, indicating matching of second bank reference data and video data from scanning the second part of said bar code, for changing the state of said second bistate means, said output means including an indicator member coupled to outputs of said first and second bistate means and responsive to a said state change in both said bistate means for indicating that the two N character code is a correct one.

16. The system of claim 15, including character display means responsive to said state change of said first bistate means for displaying characters represented by the first part of said bar code and subsequently responsive to said state change of said second bistate means for displaying the characters represented by said second part of said scanned bar code.

17. The system of claim 3, including means for sensing the presence of an article capable of bearing a bar code at a location-opposed to said scanning means, said output means comprising criterion means responsive to said output signals from said comparison means meeting said preselected criterion for producing a "good" signal and bistate means responsive to said "good" signal for changing state, means responsive to sensing of an article by said article sensing means and including first time delay means connected to said bistate means for initially resetting same for receiving such a "good" signal, second delay means responsive to said first delay means for blocking inputs to said first delay means and thereby blocking unintended resetting of said bistate means for a period sufficient to permit scanning of said bar code for at least one scanning field, and third delay means responsive to timing out of said second delay means for establishing an indication time interval, said output means further including indicator means for indicating whether the scanned bar code is correct and gating means interposed between said indicator means and said bistate means, said interposed gating means normally being blocked but having enabling inputs connected to said third delay means and enabled thereby during said indication interval for then rendering said indicator means responsive to the state of said bistate means.

18. The system of claim 3, in which said scanning means comprises a television camera having a high presistence target screen capable of storing an image for several scanning fields, and including a short duration light source actuable to illuminate an article viewed by the camera for a time substantially less than required for one scanning field by the camera and of sufficient illumination intensity for storing a usable image on the target screen of the camera, article sensing means adjacent said camera and arranged for producing an output in response to presence of an article in the field of view of the camera, and means coupling the output of said article sensing means to said light source for flashing same upon detection of said article, whereby the video signal produced by said camera from scanning of a bar code image thus stored upon said target screen is processed by said detector means to determine whether the bar code on the article viewed by the camera is a correct one.

19. A bar code reading system including a bar code emplaceable on an article, the bar code having an acquisition bar followed by a succession of uniform data spaces occupiable by a pattern of data bars to encode information characters, the system comprising:

scanning means comprising a black and white television camera for line scanning said bar code and producing a video signal representative of the arrangement of bars and spaces in scanned bar code;

a color television monitor synchronized with said camera and responsive to the camera video signal for displaying the image of the scanned bar code;

decoder means also responsive to said video signal and synchronized with said monitor for identifying the bar code on the article being scanned, said decoder means including strobe pulse means for producing a sequence of strobe pulses spaced by uniform time intervals related to the width of said acquisition bar and occurring substantially as the line of scan crosses the centers of successive data spaces of the bar code, comparison means responsive to said strobe pulses and video signal for comparing a pattern of video signal values coincident with said strobe pulses to a stored reference pattern of values corresponding to the correct bar code and for producing "compare" outputs when the two patterns correspond, and output means responsive to signals from said comparison means meeting a preselected criterion for indicating whether the scanned bar code is a correct one; and means connecting said decoder means to said monitor for displaying signals generated by said decoder means on said monitor in at least one color different from that of the displayed bar code but in superposed relation therewith, for rapid visual checking of system operation.

20. A bar code reading system including a bar code emplaceable on an article, the bar code having an acquisition bar followed by a succession of uniform data spaces occupiable by a pattern of data bars to encode information characters, the system comprising:
scanning means comprising a black and white television camera for line scanning said bar code and producing a video signal representative of the arrangement of bars and spaces in scanned bar code;
a color television monitor synchronized with said camera and responsive to the camera video signal for displaying the image of the scanned bar code;
decoder means also responsive to said video signal and synchronized with said monitor for identifying the bar code on the article being scanned, said decoder means including strobe pulse means for producing a sequence of strobe pulses spaced by uniform time intervals related to the width of said acquisition bar and occurring substantially as the line of scan crosses the centers of successive data spaces of the bar code, comparison means responsive to said strobe pulses and video signal for comparing a pattern of video signal values coincident with said strobe pulses to a stored reference pattern of values corresponding to the correct bar code and for producing "compare" outputs when the two patterns correspond, and output means responsive to signals from said comparison means meeting a preselected criterion for indicating whether the scanned bar code is a correct one; and
means connecting said decoder means to said monitor for displaying signals generated by said decoder means on said monitor in at least one color different from that of the displayed bar code but in superposed relation therewith, for rapid visual checking of system operation,
said connecting means including means connected to said strobe pulse means for applying said strobe pulses to said monitor display in a color contrasting to said bar code display and such as to display a series of strobe lines parallel to and normally centered on each of said data spaces of the displayed bar code for each field of scan.

21. A bar code reading system including a bar code emplaceable on an article, the bar code having an acquisition bar followed by a succession of uniform data spaces occupiable by a pattern of data bars to encode information characters, the system comprising:
scanning means comprising a black and white television camera for line scanning said bar code and producing a video signal representative of the arrangement of bars and spaces in scanned bar code;
a color television monitor synchronized with said camera and responsive to the camera video signal for displaying the image of the scanned bar code;
decoder means also responsive to said video signal and synchronized with said monitor for identifying the bar code on the article being scanned, said decoder means including strobe pulse means for producing a sequence of strobe pulses spaced by uniform time intervals related to the width of said acquisition bar and occurring substantially as the line of scan crosses the centers of successive data spaces of the bar code, comparison means responsive to said strobe pulses and video signal for comparing a pattern of video signal values coincident with said strobe pulses to a stored reference pattern of values corresponding to the correct bar code and for producing "compare" outputs when the two patterns correspond, and output means responsive to signals from said comparison means meeting a preselected criterion for indicating whether the scanned bar code is a correct one; and
means connecting said decoder means to said monitor for displaying signals generated by said decoder means on said monitor in at least one color different from that of the displayed bar code but in superposed relation therewith, for rapid visual checking of system operation,
including a hit bar circuit responsive to a correct code indication by said output means for producing a hit bar signal substantially for the duration of the next scan line following said indication, said connecting means including a portion coupling said hit bar circuit to said monitor for display of said hit bar signal as a contrasting color bar extending across the bar code display adjacent the scanned portion of the code which resulted in said correct code indication.

22. A bar code reading system including a bar code emplaceable on an article, the bar code having an acquisition bar followed by a succession of uniform data spaces occupiable by a pattern of data bars to encode information characters, the system comprising:
scanning means comprising a black and white television camera for line scanning said bar code and producing a video signal representative of the arrangement of bars and spaces in scanned bar code;
a color television monitor synchronized with said camera and responsive to the camera video signal for displaying the image of the scanned bar code;
decoder means also responsive to said video signal and synchronized with said monitor for identifying the bar code on the article being scanned, said decoder means including strobe pulse means for producing a sequence of strobe pulses spaced by uniform time intervals related to the width of said acquisition bar and occurring substantially as the line of scan crosses the centers of successive data spaces of the bar code, comparison means responsive to said strobe pulses and video signal for comparing a pattern of video signal values coincident with said strobe pulses to a stored reference pattern of values corresponding to the correct bar code and for producing "compare" outputs when the two patterns correspond, and output means responsive to signals from said comparison means meeting a preselected criterion for indicating whether the scanned bar code is a correct one; and
means connecting said decoder means to said monitor for displaying signals generated by said decoder means on said monitor in at least one color different from that of the displayed bar code but in superposed relation therewith, for rapid visual checking of system operation, noise in the camera video signal and improving the waveform of the latter to thus produce a processed video signal, said processing means supplying the video signal for said strobe pulse means and comparison means, said connecting means including a portion capable of displaying said processed video waveforms superposed on the camera video waveform but in a contrasting color, said processing means including means adjustable for properly setting the noise level in said processed video wherein achievement of the proper adjustment is visible on the monitor as a transition in bar code display color between the raw video display color and the processed video display color.

23. The system of claim 19, including window logic means providing signals while the scanning beam of the camera is in a window area spaced within its scanning field, means responsive to a said window signal and coupled to said strobe pulse means for blocking production of strobe pulses when said scanning beam is outside said window area, said connecting means including a portion applying a said window signal to said monitor for displaying said window and the field area surrounding it in colors different from each other and from said bar code display, said decoder means including switch means coupled to said monitor and adjustable for displaying additional signals from said decoder means in at least one additional color.

24. A system for scanning sequentially presented ones of a series of vials to detect visual discontinuities carried whereby, the system comprising:

scanning means comprising a black and white television camera for multiple line scanning each said vial and producing a video signal representative of discontinuities in the appearance of each vial;

a color television monitor synchronized with said black and white camera and responsive to the camera video signal for displaying in a first color an image from scanning at least a selected portion of said vial;

decoder means also responsive to said video signal and synchronized with said monitor and responsive to said discontinuities in the scanned appearance of said vial for producing decoder output signals indicative of whether or not the vial is acceptable; and means connecting said decoder means to said monitor for displaying signals generated by said decoder means on said monitor in at least one second color different from said first color, but in superposed relation with said first color image, for rapid visual checking of system operation;

said decoder means including a bar circuit responsive to determination by the decoder means whether the vial appearance is acceptable or not for producing a bar signal substantially for the duration of at least one scan line following such determination, said bar signal being at least one of said decoder output signals, and means coupling such bar circuit to the monitor for display of such bar signal as a color bar in one said second color extending across said first color image on the monitor adjacent the scanned portion of the vial which resulted in such bar signal;

said decoder means further including window logic means providing window signals while the scanning beam of the camera is in a window area spaced within its scanning field, and means responsive to said window signal for preventing signal generation by said decoder means when the scanning beam of the camera is outside said window area, means applying the window signal from said decoder means to said monitor for displaying said window on the monitor in a color contrasting with the background color displayed by the monitor and with the color of said displayed bar and upon which signals of said first color are also distinguishable.

* * * * *

UNITED STATES PATENT AND TRADEMARK OFFICE
CERTIFICATE OF CORRECTION

PATENT NO. : 4 044 227
DATED : August 23, 1977
INVENTOR(S) : James P. Holm and Ronald J. Dudley It is certified that error appears in the above–identified patent and that said Letters Patent are hereby corrected as shown below:

Column 8, line 26; change "54" to ---52---.
Column 10, line 45; change "ine" to ---line---.
Column 21, line 45; change "canning" to ---scanning---.
Column 22, line 3; before "pulses" insert ---strobe---.
Column 23, line 9; change "mean" to ---means---.
Column 24, line 25; change "Claim 3" to ---Claim 13---.
Column 28, line 12; before "including" insert ---said decoder---.
Column 28, line 57; after "operation," insert ---said decoder including a video waveform processing means capable of reducing---.
Column 29, line 4; after "providing" insert ---window---.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*